March 28, 1967    J. DAUGHERTY    3,311,024
ROTARY ACTUATOR POWER DRAWBOLT FOR MACHINE TOOL SPINDLES
Original Filed Feb. 9, 1965    5 Sheets-Sheet 3
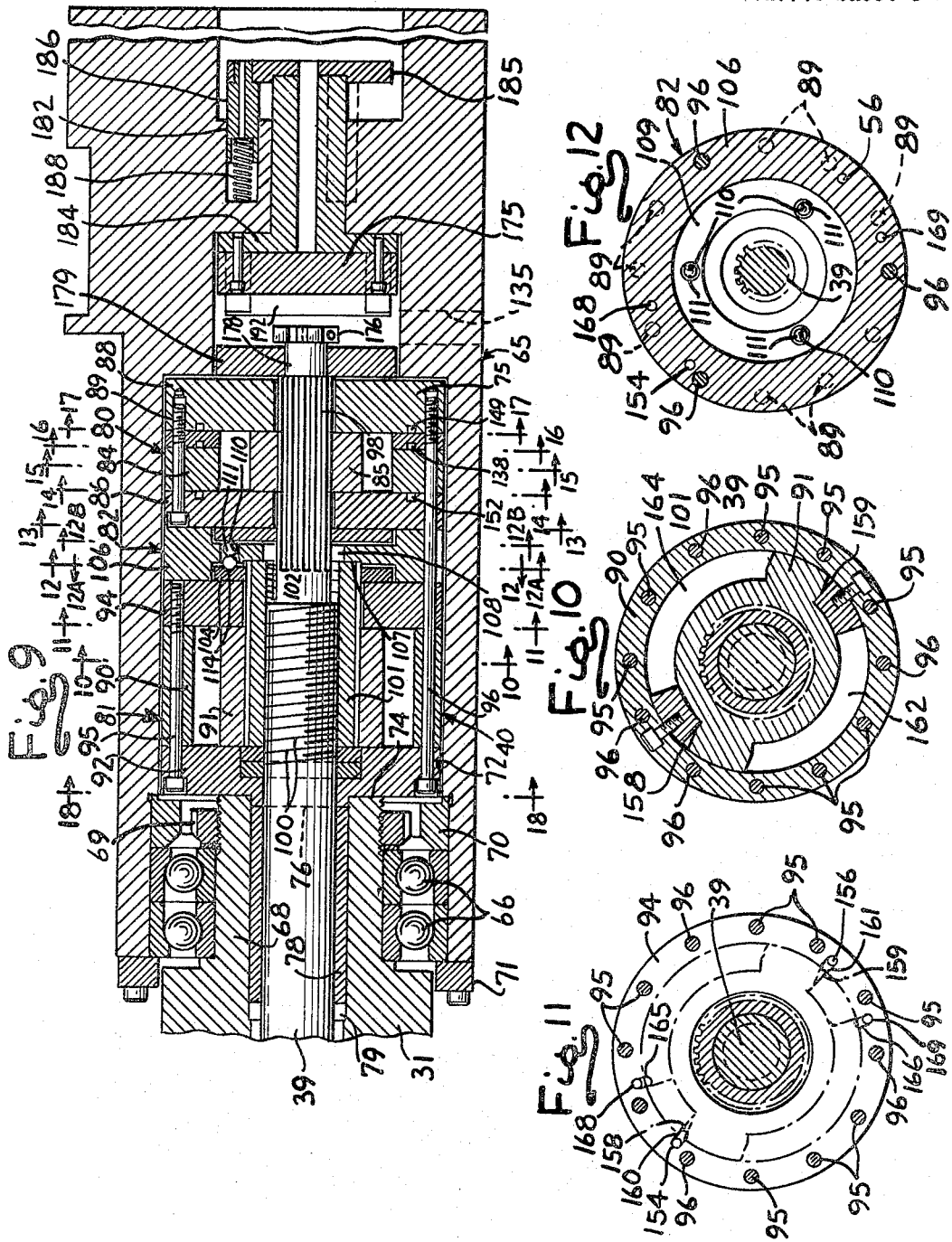
INVENTOR
JESSE DAUGHERTY
by: Wolfe, Hubbard, Voit & Osann
ATTYS.

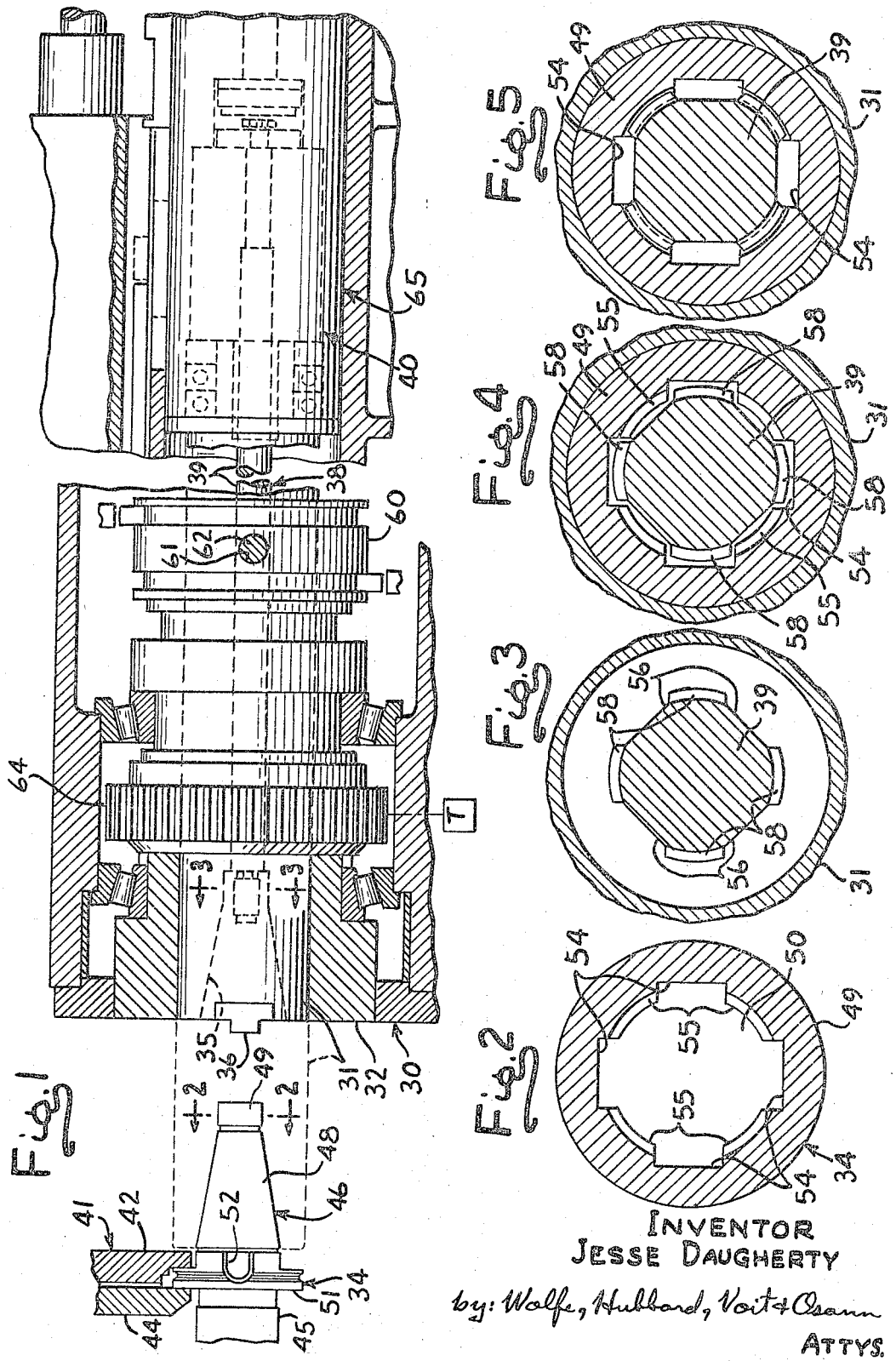

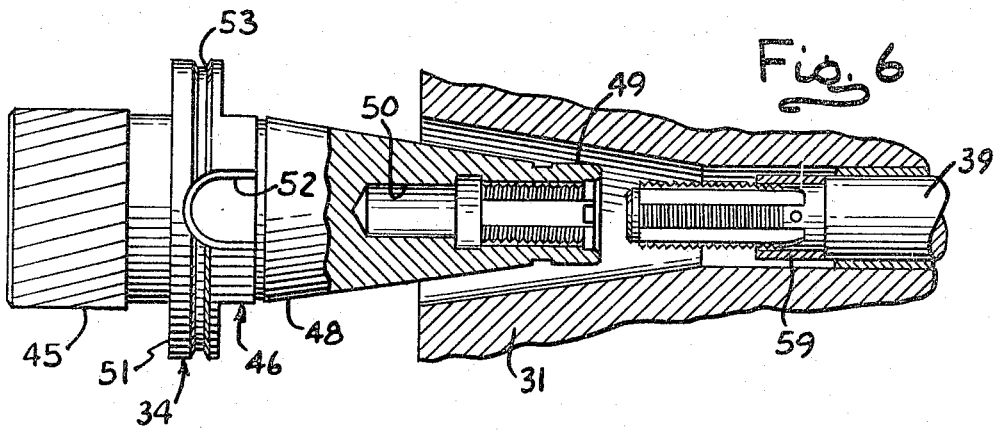
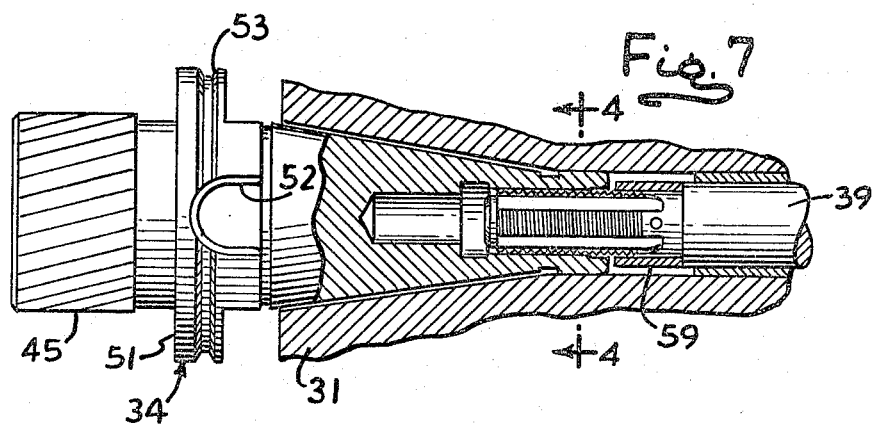
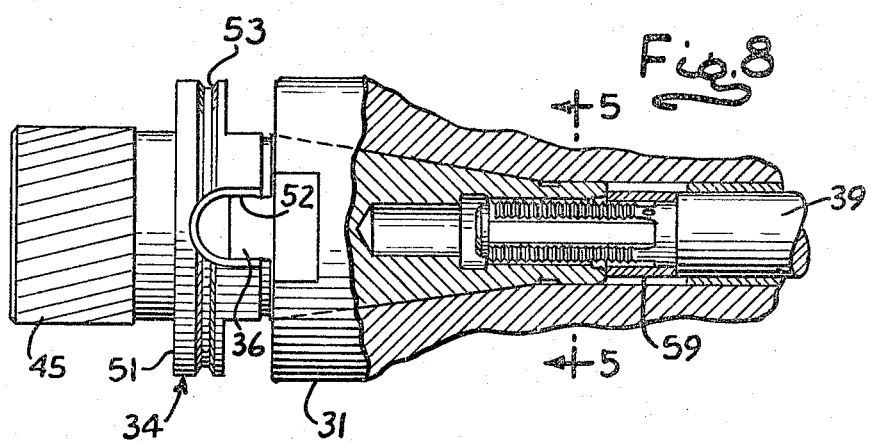

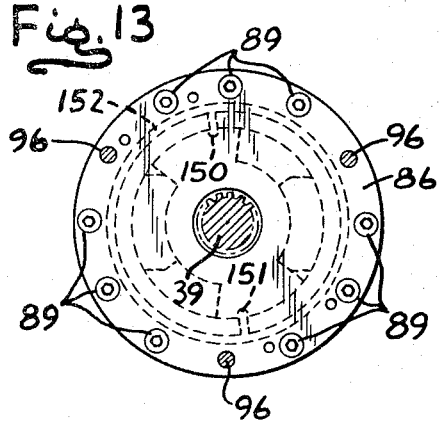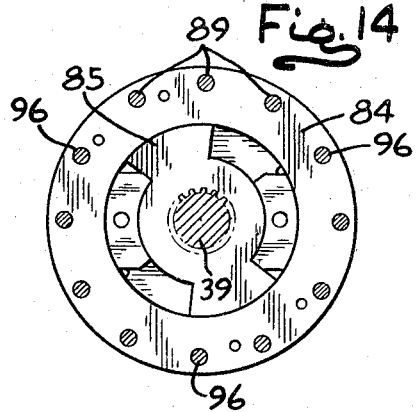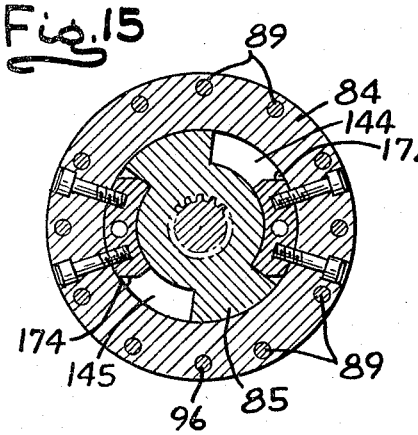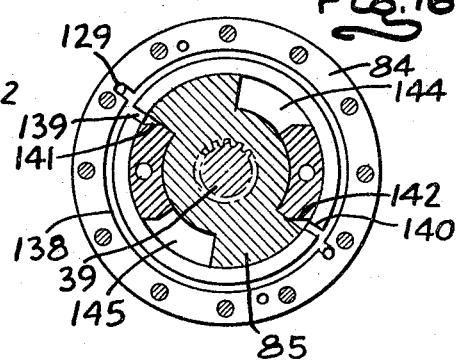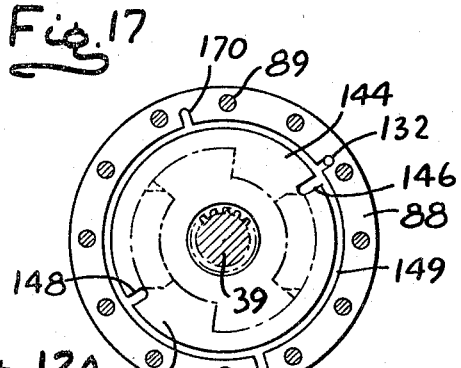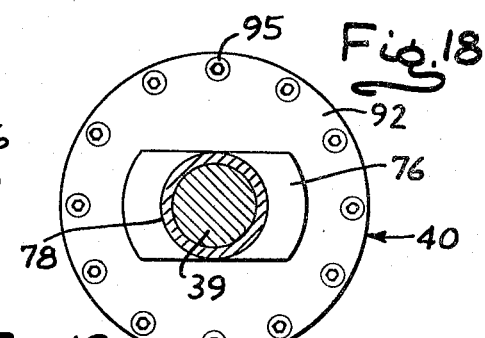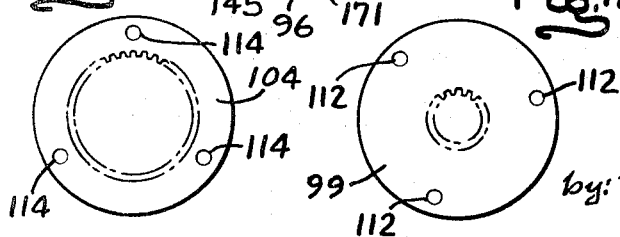

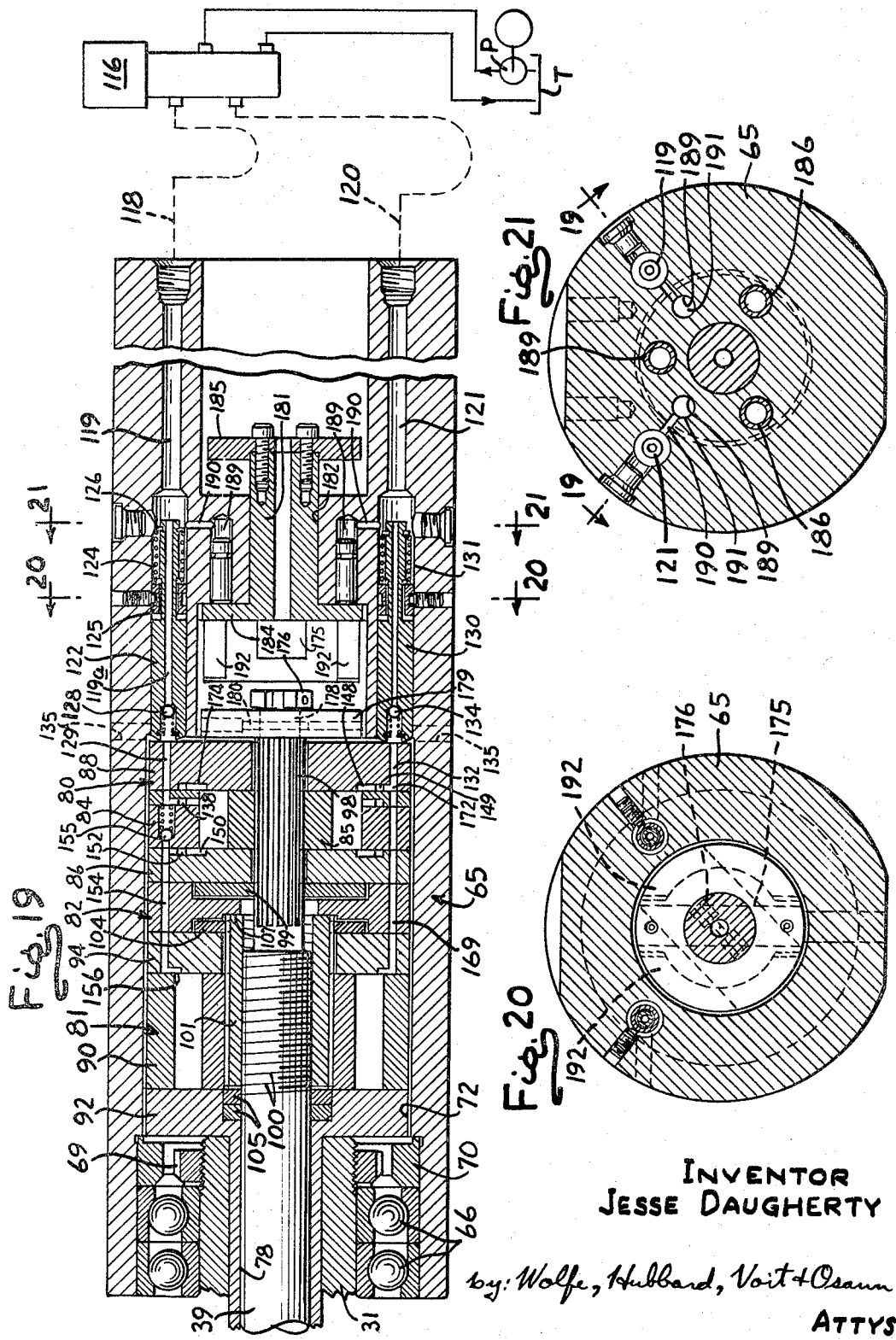

United States Patent Office 3,311,024
Patented Mar. 28, 1967

3,311,024
ROTARY ACTUATOR POWER DRAWBOLT FOR MACHINE TOOL SPINDLES
Jesse Daugherty, Fond du Lac, Wis., assignor to Giddings & Lewis Machine Tool Company, Fond du Lac, Wis., a corporation of Wisconsin
Continuation of application Ser. No. 431,368, Feb. 9, 1965.
This application Aug. 1, 1966, Ser. No. 569,532
9 Claims. (Cl. 90—11)

This application is a continuation of my application Ser. No. 431,368, filed Feb. 9, 1965 and now abandoned.

The present invention relates to machine tools and, more specifically, to a rotary actuator power drawbolt for securing a tool in the power driven spindle of a machine tool. The invention finds particular, but not exclusive, utility when embodied in a machine tool which includes an automatic tool changing apparatus. This invention represents an improvement over the power drawbolt disclosed in my copending application Ser. No. 338,108, filed Jan. 16, 1964, which issued as U.S. Patent No. 3,254,567 on June 7, 1966.

A machine tool having an automatic tool changing apparatus may be operated under automatic control or, occasionally, under manual control. Automatic operation may, for example, be effected by numerical control from a source of command signals derived from a magnetic or punched paper tape through a control system connected to operate the various power driven components of the machine. Such a machine is adapted to perform a series of machining operations with interspersed tool changing operations, and to perform both the machining and tool changing operations in a given program automatically from start to finish. While the power drawbolt of the present invention is applicable to a wide variety of machine tool configurations, it is particularly advantageous in a machine tool incorporating automatic tool changing apparatus because of the severe demands made on a power drawbolt in such an environment.

One object of the present invention is to provide a power drawbolt adapted to operate satisfactorily in a machine tool having automatic tool changing apparatus, and susceptible of positive and rapid actuation in securing the tool in the machine tool spindle as well as in releasing the tool from the spindle.

Another object of the invention is to provide a power drawbolt of the character set forth and adapted to maintain drawbolt tension without depending on hydraulic or spring pressure for that purpose.

A further object of the present invention is to provide a power drawbolt of the foregoing type utilizing fluid actuating means which take advantage of the automatic features of the associated machine tool, resulting in substantial simplification of the mechanism.

A further object of the invention is to provide a power drawbolt of the character set forth above and adapted to provide a reliable signal indication showing the device has functioned properly.

The preceding objects and advantages, as well as others, will become apparent from the following detailed description, taken together with the accompanying drawings, wherein:

FIGURE 1 is a fragmentary vertical sectional view taken axially of the spindle in the headstock of an exemplary horizontal boring, drilling and milling machine embodying the power drawbolt of the present invention.

FIG. 2 is an enlarged transverse sectional view through the inner end portion of a toolholder engageable by the power drawbolt of the present invention, taken in the plane of the line 2—2 in FIG. 1.

FIG. 3 is an enlarged transverse sectional view through the inner end portion of the spindle and the tool engaging end portion of the power drawbolt, taken in the plane of the line 3—3 in FIG. 1.

FIG. 4 is an enlarged transverse sectional view through the interfitting portions of the drawbolt and toolholder during an initial stage of engagement, taken in the plane of the line 4—4 in FIG. 7.

FIG. 5 is a view similar to FIG. 4 but with the drawbolt and toolholder fully engaged, taken in the plane of the line 5—5 in FIG. 8.

FIGS. 6, 7 and 8 are fragmentary longitudinally sectional views taken axially of the headstock spindle, on a scale somewhat larger than that of FIG. 1, showing sequential steps in engagement between the drawbolt and toolholder.

FIG. 9 is a fragmentary longitudinal sectional view, to the same scale as FIGS. 6, 7 and 8, illustrating the fluid power actuating mechanism of the drawbolt of the invention.

FIGS. 10 through 12 and 13 through 18 are transverse sectional views of the mechanism of FIG. 9, taken respectively in the planes of the lines 10 through 12 and 13 through 18, inclusive.

FIGS. 12A and 12B are respective face views of two detent plates in the mechanism of FIG. 9, taken in the planes of the lines 12A—12A and 12B—12B.

FIG. 19 is a fragmentary longitudinal sectional view through the mechanism shown in FIG. 9, but taken on the broken section indicated by the line 19—19 in FIG. 21.

FIGS. 20 and 21 are transverse sectional views through the mechanism shown in FIG. 19, taken in the planes of the lines 20—20 and 21—21, respectively.

While the invention is susceptible of various modifications and alternative constructions, an illustrative embodiment thereof has been shown in the drawings and will be described below in detail. It should be understood, however, that there is no intention to limit the invention to the specific form disclosed, but, on the contrary, the intention is to cover all modifications, alternative constructions, and equivalents falling within the spirit and scope of the invention as expressed in the appended claims.

Referring more specifically to FIGURE 1, the invention is there shown embodied in the headstock of an illustrative machine tool such, for example, as the one disclosed in my copending application Ser. No. 338,108 mentioned above, issued as U.S. Patent No. 3,254,567 on June 7, 1966. That machine tool happens to be a horizontal boring, drilling and milling machine incorporating an automatic tool changing apparatus and a power drawbolt. Since the present invention is an improvement over the power drawbolt of such machine, reference may be made to the aforesaid application for a more complete description of the various features of the machine which represent an environment in which the invention finds particular but not exclusive utility.

It will, accordingly, be sufficient for present purposes to note that the illustrative boring, drilling and milling machine comprises the usual bed with a saddle and worktable slidably positionable thereon with respect to a vertical column fixed to the bed (not shown). The machine is provided with a headstock 30 (FIG. 1) vertically movable and positionable on guideways fixed to the vertical column. An extensible power driven spindle 31, rotatably and translatably supported in the headstock 30 by a spindle sleeve 32, is adapted to receive and drive a tool 34 such as the one illustrated in FIGS. 1, 6, 7 and 8. For this purpose, the outer end portion of the spindle 31 is formed with a tapered socket 35 and a pair of circumferentially spaced drive keys 36. A power drawbolt assembly 38 embodying the present invention is mounted concentrically of the spindle 31 for quickly engaging and disengaging the tool 34 with respect to the spindle. The assembly 38 comprises a tool-engaging drawbolt 39 mounted axially of the spindle and connected with an actuating mechanism 40 at the inner end of the spindle.

The machine also comprises in this instance an automatic tool changing apparatus (not shown in detail) for automatically transferring a succession of tools such as the tool 34 from a storage matrix at the rear of the headstock to an operating station at the spindle and for subsequently returning them to the storage matrix. The tools are individually transported to and from the matrix by a shuttle (not shown). A tool exchange arm having one or more gripping devices 41 (FIG. 1) with relatively movable opposed jaws 42, 44, is arranged to shift tools individually between the shuttle and the spindle.

The tool 34, shown in FIGS. 1, 2, 6, 7 and 8, is illustrative of the large selection of tools adapted to be stored in the matrix. In this instance, the tool comprises a milling cutter 45 mounted in a toolholder 46. The latter is formed with a tapered mounting shank 48 adapted to fit the tapered socket 35 of the spindle. The inner end portion 49 of the shank 48 has an internally threaded central bore 50 engageable by the threaded outer end portion of the drawbolt 39 to hold the tool in the spindle socket 35. The toolholder 46 includes a radial flange 51 situated between the cutter 45 and the tapered shank 48. The flange 51 may be advantageously utilized by the automatic tool changing apparatus as a gripping area for handling the tool. It includes a pair of circumferentially spaced recesses 52 adapted to receive and engage the spindle drive keys 36. The flange 51 may also have a peripheral V-shaped groove 53 which, in some cases, may be utilized for engagement by peripheral gripping devices.

For the purpose of effecting rapid, positive engagement and disengagement between the tool and the drawbolt, resort is had to a breech block thread connection therebetween. The threads of bore 50 of the toolholder are, accordingly, interrupted by four circumferentially spaced longitudinal grooves 54 defining four threaded segmental lands 55 therebetween (FIG. 2). In like manner, the threads of the outer end portion of the drawbolt 39 are interrupted by four circumferentially spaced longitudinal grooves 56 defining four threaded segmental lands 58 therebetween (FIG. 3). The pitch of the threads on the drawbolt lands 58 matches that of the threads on the toolholder lands 55 and the grooves 54, 56 are wider than the lands 55, 58 by an appropriate clearance distance. This arrangement permits the drawbolt and toolholder to be engaged by insertion of the drawbolt axially into the recess 50, as shown in FIGS. 4, 6 and 7, until the end 49 of the toolholder abuts the end of stop sleeve 59 on the drawbolt. Rotation of the drawbolt through an angle of no more than 45 degrees will thereupon fully engage all of the threads of the lands 55, 58, such condition being shown in FIGS. 5 and 8.

Rotation of the drawbolt with the end of the stop sleeve 59 abutting the end portion 49 of the toolholder is facilitated by forming the threads of the lands 55, 58 to allow a slight amount of axial lost motion. Consequently, the drawbolt may be rotated without binding at the end of the stop sleeve 59 or overstressing the engaged threaded lands. In the present instance, a quadrifid thread connection has been illustrated but it will be appreciated that other suitable numbers of grooves and lands may be employed, the particular number determining the extent of rotation required for engagement and the axial forces which may be applied to the toolholder by the drawbolt.

For satisfactory operation in an automatic tool changing cycle, provision is made in the machine to establish the same precise angular relationship between the toolholder, the spindle, and the threaded end of the drawbolt for each cycle. The automatic tool changing apparatus is thus constructed so that the position and orientation of the toolholder are precisely controlled from the time the tool is withdrawn from the matrix until it is presented to the spindle by the tool exchange arm gripping device 41. To assure the desired initial angular position of the spindle, and accordingly the drawbolt, the spindle sleeve 32 is constructed with a positioning ring 60 fixed thereon (FIG. 1). The ring 60 may be formed with a radial bore 61 engageable by the tapered projecting end of a fluid actuated shot pin 62. The latter is adapted to engage the bore 61 to locate and hold the spindle in predetermined angular position necessary to achieve proper registration between the threaded end of the drawbolt and the threaded end of the toolholder, and between the spindle drive keys 36 and the recesses 52 in the toolholder flange. Rotation of the spindle is accomplished through an appropriate drive transmission indicated diagrammatically as a box T in FIG. 1 and connected with ring gear 64 fixed to the spindle drive sleeve 32. Control of the spindle positioning operation may be effected after the manner set forth in the aforesaid application Ser. No. 338,108, issued as U.S. patent No. 3,254,567 on June 7, 1966.

In order to minimize the necessary movements of the tool changing apparatus, and to make optimum use of existing mechanism, the spindle may be extended from a pre-engagement retracted position, as viewed in FIG. 1, to a position shown by the dotted lines in that figure where the tool shank 48 is loosely seated in the tapered socket 35. When this position is achieved, keys 36 are received in the keyway slots 52 and it will further be observed that the threaded end portion of the drawbolt 39 is received in the threaded bore 50.

Axial extension and retraction of the spindle 31 is accomplished by means of a ram 65 supported within a headstock 30. The ram is adapted to transmit an axial thrust from a suitable feed transmission (not shown) to the spindle for feed or positioning purposes. In the latter event, various stop abutments between the headstock frame and the ram may be used for determining selected axial positions of the latter. The inner end portion of the spindle 31 is rotatably coupled to the ram 65 for axial translation therewith by means of a pair of thrust bearings 66. The latter are locked in place on reduced diameter end portion 68 of the spindle by means of a retainer nut 69. The bearings 66 are locked axially in the ram 65 between spacer collar 70 and retainer collar 71 fixed to the spindle end of the ram. The ram also houses drawbolt actuating mechanism 40 as well as the thrust bearing connection with the spindle. For this purpose, the ram is formed with a stepped longitudinal bore 72.

The actuating mechanism 40 is fashioned as a generally cylindrical unit housed telescopically within the bore 72 between the end face 74 of the spindle and an internal shoulder 75 in the ram. The bore 72 is of sufficient length to accommodate the unit 40 with a limited amount of end clearance or float, such, for example, as 0.009", between the end face 74 and the shoulder 75. The mechanism 40, while retained axially within the bore 72 with limited axial motion relative to the spindle, is bodily connected to the latter for direct rotation therewith. This is accomplished in the present instance by means of a relatively flat diametrically extending key 76 which engages a corresponding keyway in the end face 74 of the spindle (FIGS. 9 and 18). The mechanism 40 also includes a hub 78 received in an axial bore 79 in the inner end portion 68 of the spindle.

Provision is made in the assembly 38 for effecting positive actuation of the drawbolt 39 in two sequential steps, both on engagement and disengagement of the toolholder. For engagement or clamping these two steps are first, effecting full threaded engagement with the toolholder and second, applying axial tension to seat the tapered shank of the toolholder firmly in the spindle socket. For disengagement or unclamping, these steps are reversed and the additional step of an axial thrust to break the frictional contact between the toolholder and the spindle socket is interposed.

The foregoing is accomplished by utilizing in the actuating mechanism 40 two rotary fluid actuators mechanically interlocked for sequential operation on the drawbolt 39. The mechanism 40 is, accordingly, constructed as a laminated unit comprising first and second hydraulic motors 80, 81 with an interlock section 82 interposed between. The motor 80 in this case comprises a stator 84, a vane-type rotor 85, and a pair of end caps 86, 88 secured together as by means of a plurality of circumferentially spaced retaining screws 89. By the same token, the motor 81 comprises a stator 90, a vane-type rotor 91, end caps 92, 94, and a plurality of circumferentially spaced retaining screws 95. The entire assembly comprising the motors 80, 81 and the interlock section 82 is secured together as a unitary assembly by means of a plurality of long assembly screws 96. The unit is telescoped over the inner end portion of the drawbolt 39 and connected with it so as to achieve the sequential operation mentioned above.

The motor 80 has a direct connection with the drawbolt 39. For this purpose, that portion of the drawbolt extending into the motor 80 is formed with longitudinal splines 98 which mate with corresponding longitudinal splines in the bore of the rotor 85. These splines continue into the interlock section 82 and mate with corresponding splines in a detent plate 99.

The motor 81 has a lost motion connection with the drawbolt 39. In this instance, the portion of the drawbolt 39 extending through the motor 81 is formed with a plurality of threads 100 which engage the threaded bore of a tensioning nut 101. The outer periphery of the latter is formed with longitudinal splines 102 which mate with corresponding longitudinal splines in the bore of the rotor 91. The nut 101 extends beyond the motor 81 and partially into the interlock section 82. This extended portion of the nut carries a detent plate 104 having corresponding splines which engage those of the nut. The opposite end of the nut 101 is adapted to bear against a pair of thrust washers 105 situated in the end cap 92.

Turning now to the interlock section 82 (FIGS. 9, 12, 12A, 12B), it will be noted that the latter in this instance comprises a fixed cylindrical partition 106 having a central bore 108 sufficiently large in diameter to clear the drawbolt 39. The partition 106 has annular recesses in its respective end faces to receive the detent plates 99, 104 with sufficient clearance to permit rotation of the same. The partition 106 may also have a further annular recess 107 to accommodate the end of the nut 101. The central annular portion 109 of the partition 106 is formed with a plurality of circumferentially spaced axial bores 110, in this case three in number spaced 120° apart. Each of the bores 110 contains a pair of hardened steel balls 111 having a total diameter somewhat greater than the axial length of the bores 110. The detent balls 111 thus tend to project axially from one end or the other of the bores 110.

The detent plates 99, 104 are formed with corresponding sets of recesses 112, 114, respectively, in their respective faces adjacent the annular portion 109 of the partition 106. In the operation of the mechanism 40, the plates 99, 104 are adapted to be brought into registration alternately with the bores 110 and detent balls 111. Such registration has the effect of locking the registered plate against rotation while permitting the other plate to be rotated. In this instance, the detent plates 99, 104 are initially given angular positions 45° apart.

By reason of the foregoing arrangement, when the drawbolt mechanism 40 is in its initial unclamped position, indicated in FIG. 9, the detent balls 111 are registered with the recesses 114 of the plate 104. This leaves the detent plate 99 and its associated motor 80 free to rotate but locks the plate 104 and its motor 81 against rotation. Upon application of fluid pressure to the rotor 85 of the motor 80, the latter, together with the drawbolt 39 and the detent plate 99 is rotated through an angle of 45°. This brings the recesses 112 of the plate 99 into registration with the bores 110 and detent balls 111. The balls are thereby permitted to regress into the recesses 112 of the plate 99, unlocking the plate 104 and its associated motor 81. Upon application of fluid pressure to the rotor 91 of the motor 81 under such conditions, the latter and the nut 101 splined thereto rotate through an angle approaching 112°. Because of the engagement of the nut 101 with the threads 100 of the drawbolt, the nut 101 tends to shift axially to the left as viewed in FIG. 9 and to press against the thrust washers 105. This shifts the drawbolt axially to the right by an amount which may, for example, be 0.008", tensioning the drawbolt 39 and firmly seating the shank of the toolholder in the spindle socket.

For unclamping, the foregoing sequence is reversed. The interlock connections just described permit reverse rotation of the motor 81 to release tension on the drawbolt 39 while precluding rotation of the motor 80. Such action drives the nut 101 in the opposite direction relative to the threads 100 and presses the right-hand end of the nut, as viewed in FIG. 9, against recess 107 of the annular portion 109 of the partition. This provides a reaction axially of the drawbolt, producing an impact between the end of the stop sleeve 59 and the inner end portion of the toolholder, breaking the toolholder shank loose from the tapered spindle socket. At that point, the detent plate 104 has its recesses 114 in registration with the bores 110 and detent balls 111, permitting rotation of the detent plate 99 and the motor 80 through a reversing angle of 45° to disengage the threaded portions of the drawbolt and toolholder, leaving the mechanism in unclamped position as shown in FIG. 9.

Fluid pressure for actuating the mechanism 40 may be supplied from an appropriate source such as motor driven pump P and tank T (FIG. 19). Supply and drain lines from this unit are connected to the mechanism 40 via a four-way, two position, solenoid operated hydraulic valve 116. The latter is connected to the ram 65 via flexible conduits 118, 120. The operation of the valve 116 is such that, in one position, the conduit 118 will be connected directly with the pressure side of the pump P and the conduit 120 will be connected with the drain to tank T. In the alternate position of the valve 116, the connections of the lines 118, 120 will be reversed.

As shown in FIG. 19, the conduit 118 is connected to a fluid passage 119 running longitudinally of the ram 65. The passage 119 has a laterally enlarged portion housing a slidable coupling plunger 122 with a longitudinal bore 119a therein communicating directly with the passage 119. The coupling plunger 122 is normally urged away from the mechanism 40 which rotates with the spindle. This is done by means of a peripheral spring 124 interposed between a fixed collar 125 in the enlarged part of the passage 119 and a lock ring 126 on the inner end of the plunger. The opposite end of the plunger is provided with a check valve 128. Upon stopping of the spindle 31 and the mechanism 40 in the predetermined rotary index position for clamping or unclamping a tool, such position being determined by the shot pin 62 (FIG. 1), the coupling plunger 122 of passage 119 has its bore 119a aligned with main fluid passage 129 in the mechanism 40. When pressure is applied to the passage 119 and bore 119a, the end face of the plunger 122 is forced into sealing contact with the end of the actuating mechanism 40. At that point, the check valve 128 opens, establishing communication between passage 119, bore 119a and passage 129. The effective piston area of the plunger 122 is sufficient to maintain such sealing contact and communication as long as pressure is applied.

In like manner, the passage 121 is laterally enlarged and provided with an identical coupling plunger 130 having a longitudinal bore 121a. The plunger 130 is normally biased away from the mechanism 40 by means of spring 131. Application of pressure fluid to the passage 121 and bore 121a overcomes this effect and urges the plunger 130 into sealing contact with the end of the mechanism 40 with the bore 121a aligned and communicating with main fluid passage 132. Continued application of fluid pressure serves to hold the check valve 134 open and transmit fluid to the passage 132.

During operation of the mechanism 40 to clamp or unclamp the drawbolt, only one of the coupling plungers 122, 130 will be in pressure sealing contact, leaving one of the passages 129, 132 open to drain. Also, during rotation of the spindle and mechanism 40 incident to machining operations, neither plunger will be in sealing contact and both passages 129, 132 will be open to drain. Unpressurized fluid thus tends to accumulate in the main bore 72 of the ram. To discharge such accumulated fluid from the ram, the latter may be provided with one or more drain passages 135, 136 (FIG. 19).

With the mechanism 40 in the condition indicated in FIGS. 9 and 19, actuation of the solenoid valve 116 to connect the passage 119 to the pressure side of the pump P and the passage 121 to the tank T will initiate a drawbolt clamping cycle. In such event, pressure fluid is supplied to the passage 119, bore 119a, and passage 129. It passes from the latter into the annular passage 138 in the stator 84 of the motor 80 and from thence via ports 139, 140 into rotor chambers 141, 142 (FIG. 16). Rotor chambers 144, 145 on the opposite side of the vanes of rotor 85 are connected to drain or tank via ports 146, 148, annular passage 149, passage 132, and drains 135, 136 (FIGS. 16, 17 and 19). Under these conditions, the rotor 85 of motor 80 and the drawbolt 39 rotate clockwise (as viewed in FIG. 16) through an angle of substantially 45° to effect engagement between the threaded lands 58 of the drawbolt and the threaded lands 55 of the toolholder. Such rotation is also imparted to the detent plate 99 associated with the motor 80, bringing the recesses 112 of the plate 99 into register with the bores 110 and detent balls 111. This unlocks the detent plate 104 and rotor 91 of motor 81.

To further insure proper sequence of motor operation, a hydraulic interlock is utilized between the motors 80 and 81 whereby pressure fluid is precluded from entering the tensioning motor 81 until the thread interlocking motor 80 has first been energized. This comprises a pressure fluid connection to the motor 81 via ports 150, 151 in the motor 80 uncovered by the angular advance of rotor 85 only after partial completion of its 45° clockwise movement (FIG. 13). The ports 150, 151 are connected with an annular passage 152 within the end cap 86 of the motor 80. The latter in turn is connected with a longitudinal passage 154, isolated from the passage 129 by check valve 155, and an additional longitudinal passage 156 (FIGS. 19 and 11). The passages 154, 156 are adapted to conduct pressure fluid to rotor chambers 158, 159 of the motor 81 via ports 160, 161 (FIGS. 11 and 10). At the same time, the opposite rotor chambers 162, 164 of the motor 81 are connected to drain via the ports 165, 166 and the passages 168, 169 (FIG. 11). With the foregoing hydraulic circuit established, the rotor 91 of the motor 81 will rotate counterclockwise, as viewed in FIG. 10, through an angle approaching 112°. Since the rotor has a splined connection with the nut 101, the latter will rotate bodily with the rotor 91 to effect tensioning of the drawbolt in the manner previously described.

When the valve 116 is operated to pressurize the passage 121 and connect the passage 119 to drain, the motors 81, 80 will be reversed sequentially to release or unclamp the drawbolt 39. In the latter event, the plunger 130 effects a pressure seal and pressurizes the passage 132 while the passage 129 is open to drain. Passage 132 connects with annular passage 149 (FIG. 17) which, in turn, connects via spur passages 170, 171 with passages 168, 169 leading to rotor chambers 162, 164 of the tensioning motor 81. Passage 149 also connects to rotor chambers 144, 145 of the motor 80 via ports 172, 174 (FIG. 15). Since the motor 80 is locked by its detent plate 99 at this time, the applied fluid pressure will act on the rotor 91 of tensioning motor 81, causing counterclockwise rotation of the rotor 91 so that the nut 101 is operated to release tension on the drawbolt. After drawbolt tension is released, further rotation of the rotor 91 causes the nut 101 to move to the right, thereby seating against the annular recess 107 in the partition 106. This produces an endwise thrust on the drawbolt which breaks the frictional contact between the shank of the toolholder and the spindle socket and also relieves the pressure on the interengaged threaded lands of the drawbolt and toolholder. Rotation of the rotor 91 brings the recesses 114 of detent plate 104 into registration with the passages 110 and detent balls 111, thereby unlocking the detent plate 99 of motor 80. Fluid pressure from the main passage 132 is now effective through ports 172, 174 to turn rotor 85 of motor 80 counterclockwise through an angular displacement of 45°. The rotor 85, being splined on the drawbolt 39, carries the latter through an angular displacement of 45° and leaves it in position for disengagement from the toolholder.

Provision is made in the drawbolt actuating mechanism 40 for generating a signal to confirm proper engagement of the drawbolt with the toolholder of an associated tool. This signal may, for example, be utilized in a safety interlock to preclude operation of the spindle drive until the drawbolt is properly engaged with the toolholder. In furtherance of such objective, a proximity switch 175 is mounted in the rearward portion of the ram 65 (FIGS. 9, 19 and 20). The switch may be of various forms and in this instance happens to be of the type which produces a signal upon angular alignment of an oblong armature 176 rotatably mounted in proximity to the switch. The armature 176 is fixed to a rearward extension 178 of the drawbolt adjacent a large flange 179 secured to the drawbolt by pin 180. The switch 175 is vertically oriented. With the drawbolt in unclamped condition, as shown in FIGS. 9 and 19, the armature is disposed at an angle of 45° with the vertical.

The switch 175 is fixed to a carrier 181 slidably mounted in a bore 182 axially aligned with the drawbolt and situated in the rearward portion of the ram (FIGS. 9 and 19). The carrier 181 has a forward flange 184 and a rearward flange 185 retaining it in the bore 182. A plurality of circumferentially spaced guide plungers 186 fixed to the rear flange 185 key the carrier 181 against rotation in the bore 182. Springs 188, acting between the ram body and the plungers 186, serve to bias the carrier 181 away from the drawbolt (FIG. 9).

The carrier is adapted to be shifted toward the drawbolt so as to overcome the bias of springs 188 whenever fluid pressure is applied to the passages 119 or 121. This is accomplished by means of two small cylinders 189 in the ram body respectively connected by radial passages 190 with the passages 119, 121 (FIGS. 19, 21). Each of the cylinders 189 has a plunger 191 which bears against the forward flange 184 of the carrier. Semi-circular buffer springs 192 fixed to the flange 184 (FIGS. 9, 19 and 20) cushion the movement of the carrier toward the drawbolt under fluid pressure and also space the switch 175 properly in relation to the armature by reason of their abutment with the drawbolt flange 179.

As noted earlier herein, clamping of the drawbolt involves the essential step of rotating it 45° to engage its threaded lands 58 with the threaded lands 55 of the toolholder. This also serves to rotate the armature 176 through 45°, bringing it into alignment with the proximity switch 175 and thus producing a signal confirming proper engagement of the drawbolt with the toolholder.

I claim as my invention:

1. A power drawbolt assembly for releasably securing a tool in the socket of a machine tool spindle, the tool having a toolholder with a bore therein and breech block type threads in the bore, the combination comprising a drawbolt disposed longitudinally of the spindle and having an outer end portion projecting into the socket, said outer end portion having breech block type threads engageable with those of the toolholder, a first rotary fluid actuator connected with said drawbolt and adapted to effect rapid engagement of said threads on said drawbolt and the toolholder, a second rotary fluid actuator connected with said drawbolt and adapted to tension the same axially to seat the toolholder in the spindle socket, and means for interlocking said first and second actuators for operation in sequence.

2. A power drawbolt assembly for releasably securing a tool in the socket of a machine tool spindle, the tool having a toolholder with a threaded bore, the combination comprising a drawbolt disposed longtitudinally within the spindle and having a threaded end portion engageable with said bore, a first fluid actuator connected to said drawbolt and adapted to effect threaded engagement between said drawbolt and the toolholder, a second fluid actuator connected with said drawbolt and adapted to exert an axial thrust on said drawbolt to seat the toolholder in the spindle socket, and means for interlocking said actuators for operation sequentially.

3. A power drawbolt assembly for releasably securing a tool in the socket of a machine tool spindle, the tool having a toolholder with breech block type threads, the combination comprising a drawbolt disposed longitudinally of the spindle and having an outer end portion projecting into the socket, said outer end portion having breech block type threads engageable with those of the toolholder, a first rotary fluid actuator directly connected with said drawbolt and adapted to effect rapid engagement and disengagement of said drawbolt and toolholder threads, a second rotary fluid actuator connected with said drawbolt and adapted to tension the same axially to seat the toolholder in the spindle socket and to release said axial tension to unseat the toolholder from the spindle socket, and means for interlocking said first and second actuators for operation in sequence on engaging said toolholder.

4. A power drawbolt assembly for releasably securing a tool in the socket of a machine tool spindle, the tool having a toolholder with rapid coupling threads thereon, the combination comprising a drawbolt disposed longitudinally within the spindle and having an end portion with rapid coupling threads thereon engageable with those of the toolholder, a first rotary fluid actuator connected to said drawbolt and adapted to effect threaded engagement and disengagement between said drawbolt and the toolholder, a second rotary fluid actuator connected with said drawbolt and adapted to exert an axial thrust on said drawbolt to seat the toolholder in the spindle socket and to unseat the toolholder from the spindle socket, and means for interlocking said actuators for operation in sequence.

5. In a machine tool, the combination comprising a power driven spindle with a tool socket therein, a toolholder adapted to seat in said socket, said toolholder having a bore therein with a plurality of circumferentially spaced threaded lands, a drawbolt disposed longitudinally of said spindle and having an end portion projecting into said socket with a corresponding plurality of threaded lands thereon, said threaded lands of said toolholder and said drawbolt being engageable upon limited relative rotation therebetween, and a rotary fluid actuator mechanism constructed and arranged to provide sequential relative rotational motion and axial tensioning of said drawbolt to seat said toolholder in said socket.

6. In a machine tool, the combination comprising a power driven spindle with a tool socket therein, a toolholder having a shank adapted to be received in said spindle socket, a drawbolt longitudinally disposed in said spindle, said drawbolt having a peripherally segmented threaded portion at one end thereof, means defining a complementary segmented threaded bore in said toolholder shank, means on said machine tool for aligning said toolholder shank and said drawbolt to permit insertion of said drawbolt therein with the threaded segments thereof alternating with the threaded segments of said toolholder bore, a first rotary fluid actuator connected to rotate said drawbolt to engage the respective threaded segments of said drawbolt and said toolholder bore, and a second rotary fluid actuator coupled with said first actuator and said drawbolt for axially tensioning the latter and securing said toolholder in said spindle.

7. A power drawbolt assembly for releasably securing a tool in the socket of a machine tool spindle, the tool having a toolholder with a threaded bore, the combination comprising a drawbolt disposed longitudinally within the spindle and having a threaded end portion engageable with said bore, a first rotary fluid actuator directly connected to another portion of said drawbolt and adapted to effect threaded engagement between said drawbolt and toolholder, a nut threadedly connected to still another portion of said drawbolt, a second rotary fluid actuator directly connected with said nut and adapted to exert thereby an axial thrust on said drawbolt to seat the toolholder in the spindle socket, and means for interlocking said actuators for operation sequentially.

8. In a machine tool, the combination of a power driven spindle with a tool socket therein, a toolholder adapted to seat in said socket, said toolholder having a bore therein with a plurality of circumferentially spaced threaded lands, a drawbolt disposed longitudinally of said spindle and having an end portion projecting into said socket with a corresponding plurality of threaded lands thereon, said threaded lands of said toolholder and said drawbolt being engageable upon limited relative rotation therebetween, a rotary fluid actuator mechanism constructed and arranged to provide sequential relative rotational motion and axial tensioning of said drawbolt to seat said toolholder in said socket, and electrical interlock means responsive to angular engagement of said threaded lands on said toolholder and said drawbolt for governing the application of power to said spindle.

9. A power drawbolt assembly for releasably securing a tool in the socket of a rotatable and translatable machine tool spindle, the tool having a toolholder with a threaded bore, and comprising, in combination, a drawbolt disposed longitudinally within the spindle and having a threaded end portion engageable with said bore, a first rotary hydraulic actuator directly connected to said drawbolt and adapted to effect threaded engagement between said drawbolt and the toolholder, a second rotary hydraulic actuator connected with said drawbolt and adapted to exert an axial thrust thereon to seat the toolholder in the spindle socket, and means for hydraulically interlocking said actuators for operation sequentially.

No references cited.

WILLIAM W. DYER, JR., *Primary Examiner.*
GERALD A. DOST, *Examiner.*